United States Patent
Litvak et al.

(10) Patent No.: US 8,594,998 B2
(45) Date of Patent: Nov. 26, 2013

(54) MULTILINGUAL SENTENCE EXTRACTOR

(75) Inventors: Marina Litvak, Beer-Sheva (IL); Mark Last, Leavim (IL); Menahem Friedman, Omer (IL)

(73) Assignee: Ben-Gurion University of the Negev Research and Development Authority, Beer Sheva (IL)

( * ) Notice: Subject to any disclaimer, the term of this patent is extended or adjusted under 35 U.S.C. 154(b) by 310 days.

(21) Appl. No.: 13/190,061

(22) Filed: Jul. 25, 2011

(65) Prior Publication Data

US 2012/0035912 A1    Feb. 9, 2012

Related U.S. Application Data

(60) Provisional application No. 61/344,468, filed on Jul. 30, 2010.

(51) Int. Cl.
G06F 17/27    (2006.01)
G06F 17/20    (2006.01)

(52) U.S. Cl.
USPC .................................................. 704/9; 704/8

(58) Field of Classification Search
None
See application file for complete search history.

(56) References Cited

U.S. PATENT DOCUMENTS 5,619,709 A * 4/1997 Caid et al. ............... 715/209
7,607,083 B2 * 10/2009 Gong et al. ............. 715/254
8,290,965 B2 * 10/2012 Waldo et al. .............. 707/751
2002/0046018 A1 * 4/2002 Marcu et al. .................. 704/9
2009/0157382 A1 * 6/2009 Bar ............................. 704/8

OTHER PUBLICATIONS

Radev at. al. 2001; Experiments in single and multidocument summarization using mead; First Document Understanding Conference.
Saggion et al., 2003; Robust generic and query-based summarization; In EACL '03: Proceedings of the tenth conference on European chapter of the Association for Computational Linguistics.
Kallel et al. 2004 (Summarization at laris laboratory; In Proceedings of the Document Understanding Conference.
Liu et al 2006b (Multiple documents summarization based on genetic algorithm; Lecture Notes in Computer Science, 4223:355.
Turney 2000 (Learning algorithms for keyphrase extraction; Information Retrieval, 2(4):303-336.

(Continued)

*Primary Examiner* — Brian Albertalli
(74) *Attorney, Agent, or Firm* — Hunton & Williams LLP (57) ABSTRACT

The invention relates to a multilingual method for summarizing an article, which comprises an offline stage in which a weights vector is determined using, among others, plurality of predefined metrics, a collection of documents and expert prepared summaries, subjection of all the document sentences to all said metrics, guess of a population of weights matrices, subjection of the population to said metrics, ranking of sentences, generation of a new population using a genetic algorithm, and repetition of the same until convergence. The invention further comprises a real time stage in which the weights vector, as determined, as well as said metrics are used to determine an extract of any new document.

5 Claims, 5 Drawing Sheets

(56) References Cited

OTHER PUBLICATIONS

Orasan et al. (2000; Enhancing preference-based anaphora resolution with genetic algorithms, Proceedings of the Second International Conference on Natural Language Processing, vol. 1835, pp. 185-195, Patras, Greece, Jun. 2-4.

Rouge Software Package Website (http://www.berouge.com/Pages/default.aspx).

Rouge-1 Recall (Lin, 2004; Rouge: A package for automatic evaluation of summaries. In Proceedings of the Workshop on Text Summarization Branches Out (WAS 2004), pp. 25-26.

Vignaux et al, 1991, A genetic algorithm for the linear transportation problem; IEEE Transactions on Systems, Man and Cybernetics, 21:445-452.

Mihalcea, 2005; Language independent extractive summarization. In AAAP05: Proceedings of the 20th national conference on Artificial intelligence, pp. 1688-1689.

Friedman et al. 1994; Fundamentals of Computer Numerical Analysis, p. 347; CRC Press.

\* cited by examiner

Fig. 4

MULTILINGUAL SENTENCE EXTRACTOR

CROSS-REFERENCE TO RELATED APPLICATIONS

This patent application claims priority to U.S. Provisional Patent Application No. 61/344,468, filed Jul. 30, 2010, which is hereby incorporated by reference herein in its entirety.

FIELD OF THE INVENTION

The invention relates to the field of processing text. More specifically, the invention relates to an automated method for extracting a summary from a text file, such as an article.

BACKGROUND OF THE INVENTION

The need to review mass amount of text is very common. Magazines and databases of articles typically provide a summary for each article to enable the reader to determine its main subject, content, and relevancy to his interest. These summaries are typically prepared by experts, for example, by the author of the article, or by another expert who reads the article, and prepares a summary of it. However, there are many cases in which the reader faces an article with no summary, in which the provided summary is not suitable for his needs, that its length is too long or too short for his needs, etc. In other cases, there are databases providers that prepare their own summaries or articles. The art has tried to provide automated summarization of articles, however, without much success. The automated methods that have been suggested thus far have not been successful in providing accurate summaries. Moreover, those suggested methods are typically language dependent, i.e., they require adaptation of the software for each specific language, wherein such an adaptation is typically very complicated.

Document e.g., an article) summaries should use a minimum number of words to express a document's main ideas. As such, high quality summaries can significantly reduce the information overload many professionals in a variety of fields must contend with on a daily basis, assist in the automated classification and filtering of documents, and increase search engines precision. Automated summarization methods can use different levels of linguistic analysis: morphological, syntactic, semantic and discourse/pragmatic. Although the summary quality is expected to improve when a summarization technique includes language specific knowledge, the inclusion of that knowledge impedes the use of the summarizer on multiple languages. Only systems that perform equally well on different languages without language-specific knowledge (including linguistic analysis) can be considered language-independent summarizers.

The publication of information on the Internet in an ever-increasing variety of languages dictates the importance of developing multilingual summarization approaches. There is a particular need for language-independent statistical techniques that can be readily applied to text in any language without depending on language-specific linguistic tools. In the absence of such techniques, the only alternative to language-independent summarization would be the labor-intensive translation of the entire document into a common language.

Linear combinations of several statistical sentence ranking methods were applied in the MEAD (Radev et al. 2001; *Experiments in single and multidocument summarization using mead; First Document Understanding Conference*) and SUMMA (Saggion et al., 2003; Robust generic and query-based summarization; In EACL '03: *Proceedings of the tenth conference on European chapter of the Association for Computational Linguistics*) approaches, both of which use the vector space model for text representation and a set of pre-defined or user-specified weights for a combination of position, frequency, title, and centroid-based (MEAD) features.

Kallel et al. 2004 (*Summarization at laris laboratory; In Proceedings of the Document Understanding Conference*) and Liu et al. 2006b (*Multiple documents summarization based on genetic algorithm*; Lecture Notes in Computer Science, 4223:355) used genetic algorithms (GAs), which are known as prominent search and optimization methods, to find sets of sentences that maximize summary quality metrics, starting from a random selection of sentences as the initial population. In this capacity, however, the high computational complexity of GAs is a disadvantage. To choose the best summary, multiple candidates should be generated and evaluated for each document (or document cluster). Following a different approach, Turney 2000 (*Learning algorithms for keyphrase extraction; Information Retrieval*, 2(4):303-336) used a GA to learn an optimized set of parameters for a keyword extractor embedded in the Extractor tool. 3. Orasan et al. (2000; *Enhancing preference-based anaphora resolution with genetic algorithms, Proceedings of the Second International Conference on Natural Language Processing*, volume 1835, pages 185-195, Patras, Greece, June 2-4) enhanced the preference-based anaphora resolution algorithms by using a GA to find an optimal set of values for the outcomes of fourteen indicators and apply the optimal combination of values from data on one text to a different text. With such an approach, training may be the only time-consuming phase in the operation.

It is an object of the present invention to provide automated summarization method, which is more accurate compared to the prior art.

It is another object of the present invention to provide such automated summarization method which is language independent, and which can almost equally be performed on different languages.

It is still another object of the present invention to provide an automated method for summarizing which after a one time performance of a training stage is applied to accurately summarize articles in a real time stage.

It is another object of the present invention to provide a cross-lingual summarization method, which is trained on a human-generated corpus in one language, and is then applied in a real time stage to summarize documents in other languages.

Other objects and advantages of the present invention will become apparent as the description proceeds.

SUMMARY OF THE INVENTION

The invention relates to a multilingual method for summarizing an article, which comprises: an offline stage which comprises: (a) predefining a set of metrics; (b) providing a collection of documents, and providing one or more of experts summaries for each article; (c) indexing the sentences, and words within each article; (d) subjecting each sentence in said articles serially to the entire set of metrics, thereby obtaining for each sentence a plurality of sentence metrics values, each relating to one of said metrics respectively; (e) guessing a population of normalized weights vectors; (f) for a selected weights vector $u_t$ in said population: (f.1) for each sentence, calculating a sentence combined value, said combined value being a linear combination of the weights vector and said sentence metrics values; (f.2) for each document ranking the sentences according to their combined values; (f.3) for each document selecting a group of sentences having highest combined values; (f.4) for each document, comparing said selected group with the one or more expert summaries, and obtaining a quality score for each article, selected group, and corresponding weights vector; (f.5) repeating steps f.1-f.4 for all the weights vectors in u; (g) based on said quality scores, calculating a total score, and checking for convergence of a total of said quality scores in respect to previous iterations; (h) upon convergence of said total quality scores, selecting a best weights vector which provides highest quality scores, and terminating the process; (i) otherwise, if no convergence has yet obtained, selecting a group a of weights vectors out of population u that have provided highest quality scores, and by means of a genetic algorithm generating a new population u' of weights vectors, and repeating steps f to h with the population u' of weights vectors until convergence; and a real time stage which comprises: (j) indexing sentences, and words within the document which needs summarization; (k) calculating each of said predefined metrics of step a with respect to each of the sentences in the document to obtain sentence metric values; (l) separately for each sentence, subjecting the sentence metrics values to the best weights vector as selected in step h of the offline stage, and summing up all the weighted values to obtain a single combined value for each sentence; (m) ranking the sentences according to their combined values to form a ranked list, and extracting a predetermined number of sentences from the top of the ranked list of sentences; and (n) combining said extracted sentences thereby forming the document summary.

Preferably, the offline stage is performed only once, while the best weights vector which is determined as a result of the offline stage is used thereafter in any performance of the real time stage.

Preferably, even before convergence, one or more of the best determined weights vectors is transferred to the new population u' which is generated by the genetic algorithm.

Said expert summaries may be abstracts or extracts.

In an embodiment of the present invention, the offline stage is performed on one language, and the resulting weights vector of the offline stage is used in real time to summarize articles in any other language.

DETAILED DESCRIPTION OF PREFERRED EMBODIMENTS

As noted above, the present invention relates to an automatic method for summarizing text files, such as articles (hereinafter, although the description refers to articles, the invention may likewise be used for summarizing other types of text files). More specifically, the method of the present invention extracts from articles a predefined number of most relevant sentences, and creates from said extracted most relevant sentences an extract of the article. In another example, the method of the present invention may produce an extract which contains a predefined number of words. The method of the invention is multilingual in the sense that it can be applied in almost identical efficiency, and without any adaptation to various languages.

The method of the present invention comprises two stages, an offline training stage and a real time summarization stage.

The offline stage uses set of predefined metrics, a large number of articles and corresponding abstracts or extracts (that are prepared in advance by experts), and a genetic algorithm to calculate a weights vector that assigns a specific weight to each of said predefined metrics.

Said predefined metrics, and said weights vector are used in the real time stage for automatically ranking the sentences of the article in terms of importance. Thereafter, several of the most important sentences are extracted to form an extract (summary) of the article.

The method of the invention will now be described in more detail.

The offline stage is targeted to provide the weights vector of the invention, a vector for assigning a weight to each metric. The weights vector is calculated only once (during the training stage), and is then used during the real time stage to form the extract of the article. The weights vector of the invention can be updated by re-running the off line stage if more training data becomes available.

Figure 1:
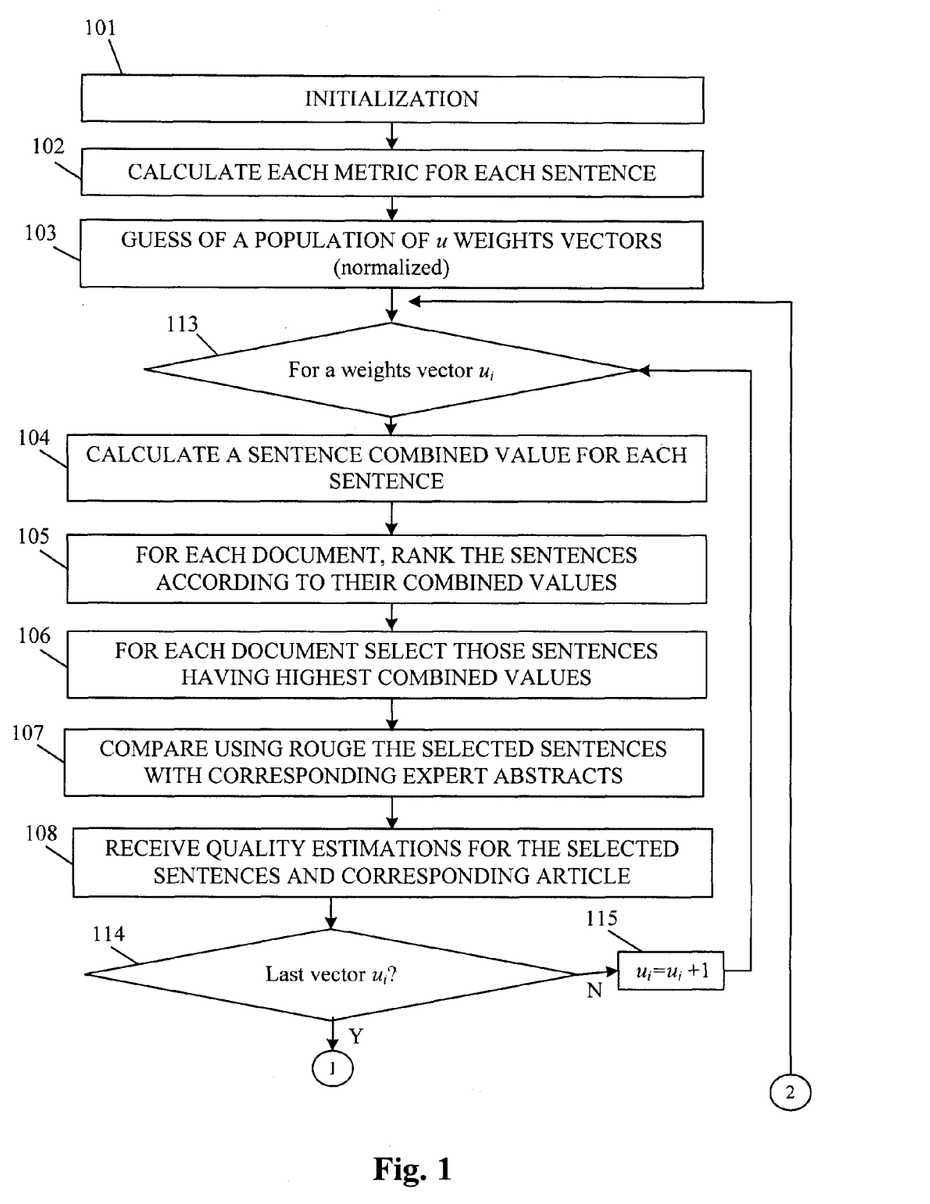
FIG. 1 is a flow diagram which illustrates the off line stage of the present invention.

FIG. 1 is a flow diagram which illustrates the training stage of the present invention. In the initialization step 101, a set of different metrics (in the following discussion, for the sake of brevity it is assumed that 31 metrics are used) is defined for use during the offline and online (real time) stages. Each of the metrics is a formula that provides an indication with respect to one or more characteristics of a given sentence in an article. For example, one metric may indicate the closeness of the sentence to the beginning of the document. Another metric may indicate the closeness of the sentence to the end of the document. Still another metric may indicate the number of words in the sentence, and so on. Preferably, more than 10 metrics are used in the present invention. The initialization step 101 further requires the collecting of many articles (for example, tens to hundreds of articles) and preparation by experts one or more abstracts (of free writing) or extracts (of specific sentences) for each article. Furthermore, the initialization stage also comprises a step of indexing of the sentences, and words within each article.

In step 102, the process continues by subjecting each sentence contained within the collection of articles to all the 31 predefined metrics. This step results in 31 sentence metric values for each sentence.

In the next step 103, a guess is made with respect to a population u (u may be, for example, 500) of weights vectors. More specifically, the initial guess assigns 31 weights (one for each metric respectively) to each of the u weights vectors. Each of the guessed weights vectors is normalized, such that all its 31 values are sum up to 1. The individual values are not limited to any pre-defined range.

In step 113 the first weights vector is selected and the following steps 104-108 are performed with respect to this selected weights vector.

In step 104, a sentence combined value is calculated for each sentence. The sentence combined value is a linear combination of all the sentence metric values, such that each metric value is multiplied by a corresponding weight from the weights vector, followed by summing up of said 31 weighted values to a single value for each sentence (therefore, resulting in a single combined value for each sentence).

In step 105 all sentences are ranked from the highest to the lowest combined value for each document.

In step 106, several (for example, typically between 5-10) of best sentences per document (i.e., those having the highest combined value) are selected to form a document extract. This operation is separately performed for each of the documents.

In step 107, the "quality" of the selected sentences for each document is determined. More specifically, a comparison is made for each document between the selected sentences and the corresponding abstracts or extracts that have been prepared by experts in the initialization step 101. This determination of quality may be performed, for example, by a freely available for academic needs Rouge Toolkit (distributed by http://berouge.com/contactus.aspx). This comparison is separately performed for each of the documents, resulting in u quality-scores for each document. The average score for all documents in the corpus is considered as a quality measure for each of u weight vectors. (step 108).

In step 109, a group a of best weight vectors out of the population of u weight vectors (for example, 100 vectors having total highest scores) are selected.

In step 110 the vectors are inspected to determine whether they have been converged, (i.e., insignificant improvement to the scores). If there is no significant improvement in the solution quality, the procedure is terminated in step 111. Upon termination, the weights vector having a highest score is selected for operation in the real time stage.

However, if the score value has not yet converged to a plateau, a genetic algorithm (GA) is used in step 112 to generate from the group of best weights vectors (those vectors selected in step 109) a new population u' of weighs vectors. The procedure repeats from step 103 with the new population u' until convergence is obtained in step 110.

As noted above, the offline stage has completed by obtaining a normalized weights vector, which is then used at the real time stage.

Figure 2:
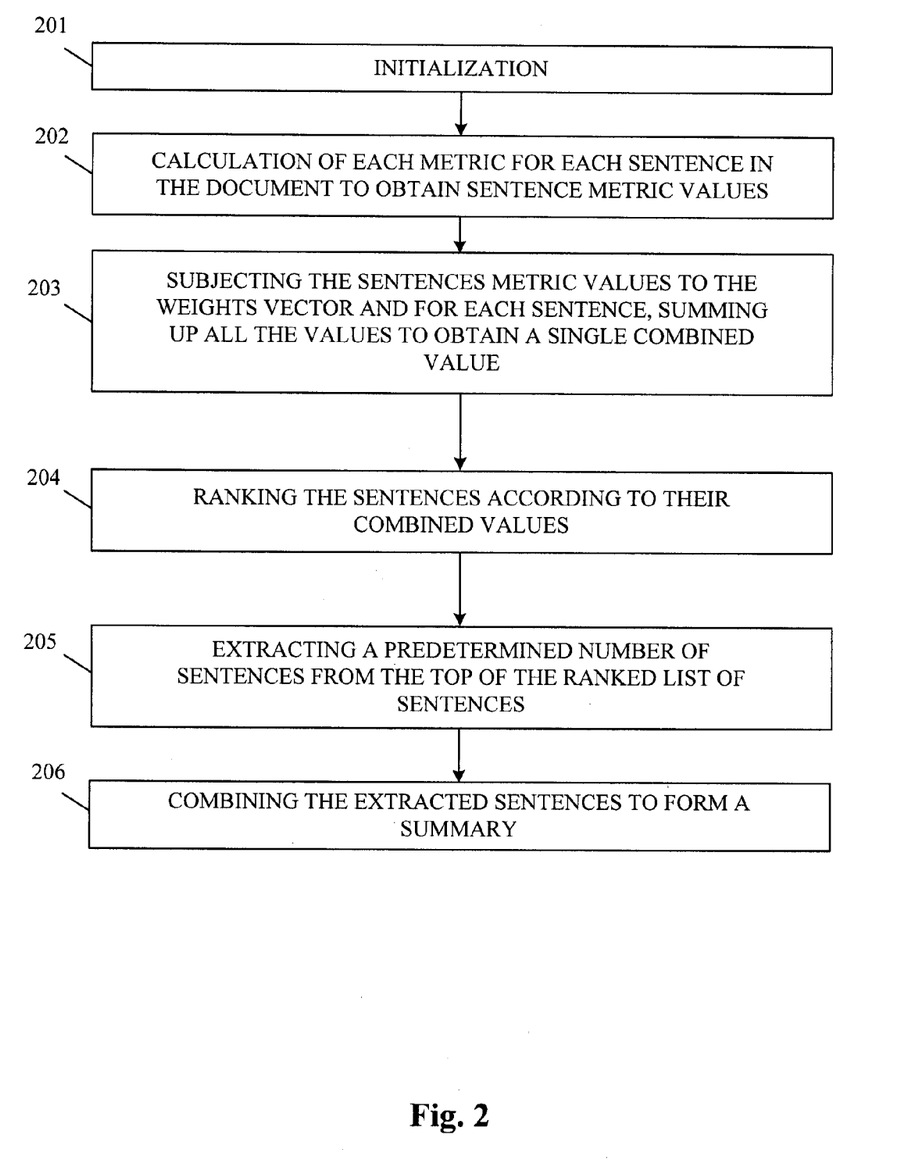
FIG. 2 is a flow diagram which illustrates the real time stage of the present invention.

The real time stage uses the weights vector as calculated once in the off-line stage. FIG. 2 is a flow diagram describing the real time process for summarizing an article. The initialization step 201 comprises definition of the metrics that are used during the real time stage. These metrics are exactly the same metrics that have been used during the offline stage. Furthermore, the initialization stage 201 also comprises a step of indexing of the sentences and words within the article.

In step 202, the real time process continues by subjecting each sentence of the article to all the 31 predefined metrics. This step results in 31 sentence values for each sentence in the article.

In step 203, all the sentences values that have been obtained in step 202 are subjected to the normalized weights vector. More specifically, the weights vector is multiplied by each sentence vector and summed up, to obtain a single combined value for each sentence.

In step 204, all the sentences are ranked according to their combined values, from the highest to the lowest, to form a ranked list of sentences.

In step 205, a predetermined number of sentences are selected from said ranked list of sentences, and these sentences are combined in step 206 to form the extract of the article according to the present invention.

In an alternative embodiment of the invention, the extract which is formed in step 206 may be limited to a predefined number of words, instead of a predefined number of sentences. This can be easily done by counting the words of the selected sentences on the top of the ranked list of sentences.

The method of the present invention, as described above, has been found to be much more accurate in forming extracts for articles than methods of the prior art. The following discussion and examples provide more practical and experimental details about the present invention.

The following discussion provides experimental settings and results, some additional aspects and practical embodiments of the present invention.

The invention is essentially aimed at identifying a best linear combination and weights of u (assuming 31) sentence metrics. An example for 31 metrics that have been used during an experimental embodiment of the invention is provided in Table 1:

TABLE 1

Sentence scoring metrics

| # | Name | Description |
|---|------|-------------|
| 1. | POS_F | Closeness to the beginning of the document $\frac{1}{i}$ |
| 2. | POS_L | Closeness to the end of the document: i |
| 3. | POS_B | Closeness to the borders of the document $\max\left(\frac{1}{i}, \frac{1}{n-i+1}\right)$ |
| 4. | LEN_W | Number of words in the sentence |
| 5. | LEN_CH | Number of characters in the sentence |
| 6. | LUHN | $\max_{i \in \{clusters(S)\}} \{CS_i\}, CS_i = \frac{W_i^2}{N_i}$ |
| 7. | KEY | Sum of the key words frequencies: $\Sigma_{i \in \{keywords(S)\}} \text{tf}(t)$ |
| 8. | COV | Ratio of key words number(Coverage): $\frac{|\text{Keywords}(S)|}{|\text{Keywords}(D)|}$ |
| 9. | TF | Average term frequency for all sentence words: $\frac{\sum_{i \in S} \text{tf}(t)}{N}$ |
| 10. | TFISF | $\sum_{i \in S} \text{tf}(t) \times \text{isf}(t), \text{isf}(t) = 1 - \frac{\log(n(t))}{\log(n)}$, n(t) is the number of sentences containing t |
| 11. | SVD | Length of a sentence vector in $\Sigma^2 \cdot V^T$ after computing Singular Value Decomposition of a term by sentences matrix $A = U\Sigma V^T$ |
| 12. | TITLE_O | Overlap similarity to the title: $\text{sim}(S, T) = \frac{|S \cap T|}{\min\{|S|, |T|\}}$ |
| 13. | TITLE_J | Jaccard similarity to the title: $\text{sim}(S, T) = \left|\frac{S \cap T}{S \cup T}\right|$ |
| 14. | TITLE_C | Cosine similarity to the title: $\text{sim}(\vec{S}, \vec{T}) = \cos(\vec{S}, \vec{T}) = \frac{\vec{S} \cdot \vec{T}}{|\vec{S}| \cdot |\vec{T}|}$ |

TABLE 1-continued

Sentence scoring metrics

| # | Name | Description |
|---|---|---|
| 15. | D_COV_O | Overlap similarity to the document complement $$\text{sim}(S, D-S) = \frac{|S \cap T|}{\min\{|S|, |D-S|\}}$$ |
| 16. | D_COV_J | Jaccard similarity to the document complement $$\text{sim}(S, D-S) = \frac{|S \cap T|}{|S \cup D-S|}$$ |
| 17. | D_COV_C | Cosine similarity to the document complement $$\text{sim}(\vec{S}, \overrightarrow{D-S}) = \frac{\vec{S} \cdot \overrightarrow{D-S}|}{|\vec{S}| \cdot |\overrightarrow{D-S}|}$$ |
| 18.<br>19.<br>20. | LUHN_DEG<br>KEY_DEG<br>COV_DEG | Graph based extensions of LUHN, KEY and COV measures respectively. Node degree is used instead of a word frequency: words a reconsidered significant if they are represented by node shaving a degree higher than a predefined threshold |
| 21. | DEG | Average degree for all sentence nodes: $$\frac{\sum_{i \in \{words(S)\}} \text{Deg}_i}{N}$$ |
| 22. | GRASE | Frequent sentences from bushy paths are selected. Each sentence in the bushy path gets a domination score that is the number of edges with its label in them path normalized by the sentence length. The relevance score for a sentence is calculated as a sum of its domination scores overall paths. |
| 23.<br>24.<br>25. | LUHN_PR<br>KEY_PR<br>COV_PR | Graph-based extensions of LUHN, KEY and COV measures respectively. Node Page Rank score is used instead of a word frequency: words are considered significant if they are represented by node shaving a Page Rank score higher Than a predefined threshold |
| 26. | PR | Average Page Rank for all sentence nodes: $$\frac{\sum_{i \in S} \text{PR}(t)}{N}$$ |
| 27. | TITLE_E_O | Overlap-based edge matching between title and sentence graphs |
| 28. | TITLE_E_J | Jaccard-based edge matching between title and sentence graphs |
| 29. | D_COV_E_O | Overlap-based edge matching between sentence and a document complement graphs |
| 30. | D_COV_E_J | Jaccard-based edge matching between sentence and a document complement graphs |
| 31. | ML_TR | Multilingual version of Text Rank without morphological analysis: (Mihalcea, 2005) Sentence score equals to Page Rank (BrinandPage, 1998) rank of its node: $$WS(V_i) = (1-d) + d * \sum_{V_j \in In(V_i)} \frac{w_{ji}}{\sum_{V_x \in Out(V_j)} w_{jk}} WS(V_j)$$ |

Figure 3:
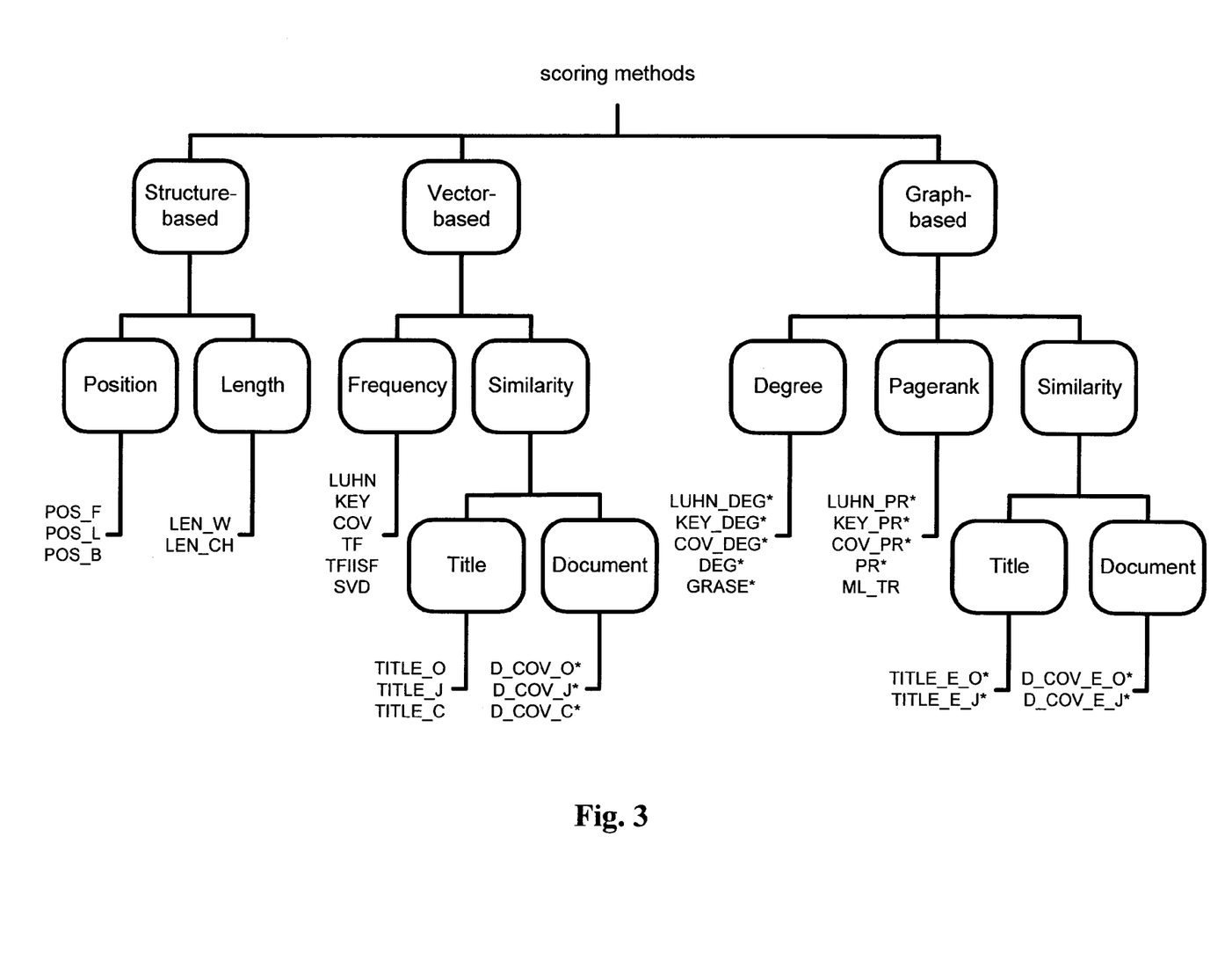
FIG. 3 shows the categorization of the metrics as used in an embodiment of the present invention.

The formulas within table 1 incorporate the following notation: a sentence is denoted by S, a text document by D, the total number of words in S by N, the total number of sentences in D by n, the sequential number of S in D by i, and the in-document term frequency of the term t by tf(t). In the $6^{th}$ metric, Wi and Ni are the number of keywords and the total number of words in the $i^{th}$ cluster, respectively, such that clusters are portions of a sentence bracketed by keywords, i.e., frequent, noncommon words. FIG. 3 demonstrates the taxonomy of the metrics listed in Table 1. Metrics that require pre-definition of threshold values are listed in Table 2 together with the average threshold values obtained after method evaluation on English and Hebrew corpora.

TABLE 2

Selected thresholds for threshold-based metrics

| Method | Threshold |
|---|---|
| LUHN | 0.9 |
| LUHN_DEG | 0.9 |
| LUHN_PR | 0.0 |
| KEY | [0.8, 1.0] |
| KEY_DEG | [0.8, 1.0] |
| KEY_PR | [0.1, 1.0] |
| COV | 0.9 |
| COV_DEG | [0.7, 0.9] |
| COV_PR | 0.1 |

Each of said metrics was evaluated on both corpora, with different threshold $t \in [0,1]$ (only numbers with one decimal digit were considered). Threshold values resulted in the best ROUGE-1 scores were selected. A threshold of 1 means that all terms are considered, while a value of 0 means that only terms with the highest rank (tf, degree, or pagerank) are considered. The metrics are divided into three main categories: structure, vector, and graph-based according to a text representation model (this text representation model may represents the text to the method as a set of words, as a graph, etc. Each category is also divided into sub-categories.

The vector-based scoring metrics listed in Table 1 uses tf or tf-idf term weights to evaluate sentence importance. In contrast, representation used by the graph-based methods (except for ML_TR—the last metric in Table 1) is based on word-based graph representation models, where each document is represented by a directed, labeled non-weighted graph with nodes represent unique terms (distinct words) and edges represent order-relationships between two terms. There is a directed edge from A to B if an A term immediately precedes the B term in any sentence of the document. For example, a graph representation model of the sentence "Scientists write papers." has three nodes representing the terms "scientists", "write", and "papers" connected by two directed edges: "scientists"=>"write" and "write"=>"papers". In the method of the present invention, each edge is labeled with the IDs of all sentences in a given article that contain both words in the specified order.

Figure 4:
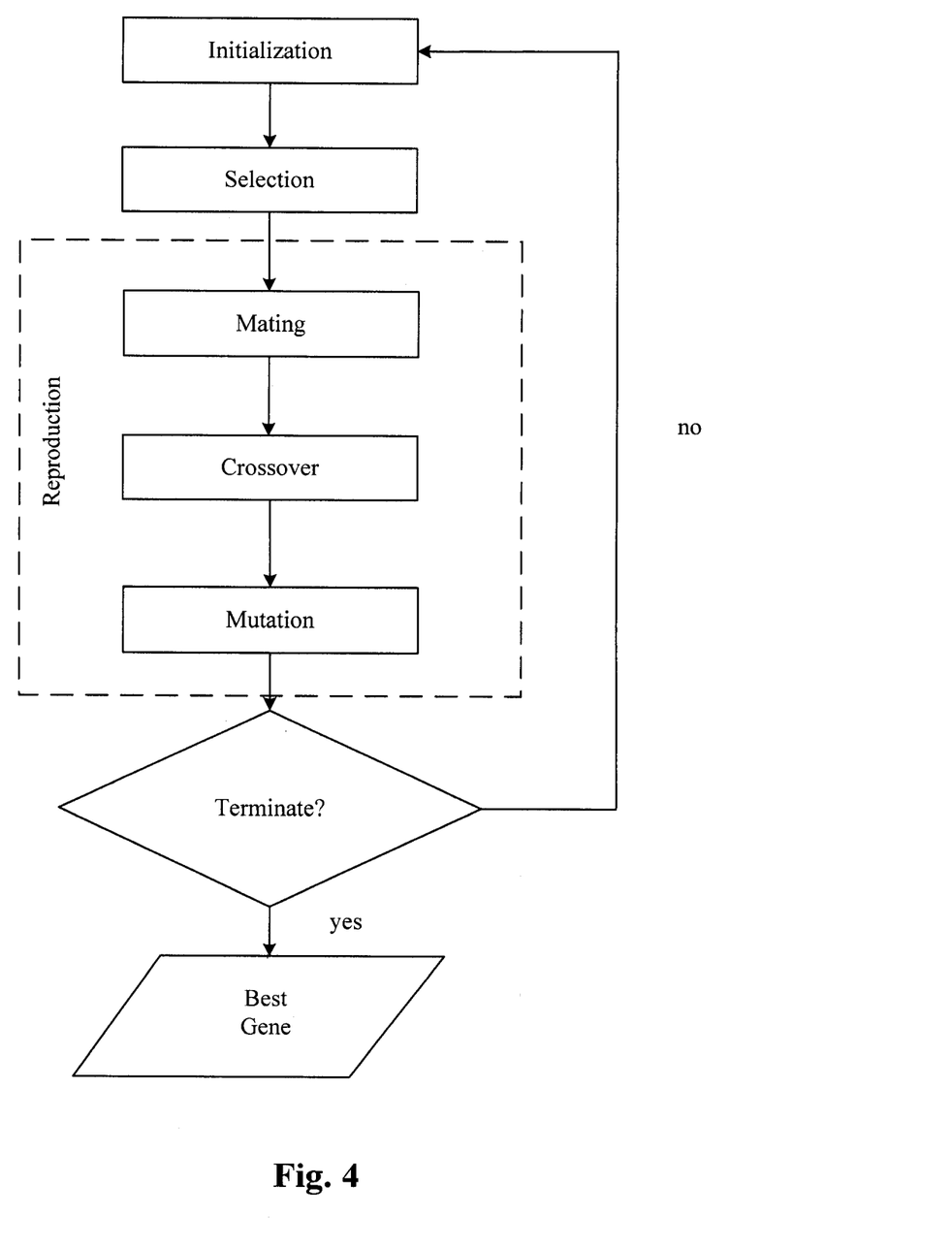
FIG. 4 illustrates a typical Genetic Algorithm process, as used by the present invention.

The best linear combination of the metrics of Table 1 have been found using a Genetic Algorithm. GAs are categorized as global search heuristics. FIG. 4 shows a simplified typical GA flowchart. A typical genetic algorithm requires (1) a genetic representation of the solution domain, and (2) a fitness function to evaluate the solution domain. In the present invention, the solution was represented as a vector of weights for a linear combination of sentence scoring metrics—real-valued numbers in the unlimited range, normalized in such a way that they sum up to 1. The vector size is fixed and it equals to the number of metrics used in the combination. Defined over the genetic representation, the fitness function measured the quality of the represented solution. A Rouge-1 Recall (Lin, 2004; *Rouge: A package for automatic evaluation of summaries*. In *Proceedings of the Workshop on Text Summarization Branches Out (WAS* 2004), pages 25-26) was used as a fitness function for measuring the summarization quality. It has been found that the summarization quality (i.e., the Rouge-1 score) was improved upon each iteration of the method, until reaching some maximal level.

As noted above, a GA is used to re-populating the u population of weights vectors (step 112 of FIG. 1), given a reduced set of best found weight vectors (step 109). The GA typically explores only a small part of the search space, if the population is too small, whereas it slows down the process if there are too many solutions. The experiment started from N=500 randomly generated genes/solutions as an initial population, that was empirically proven as a good choice. Each gene is represented by a weighting vector $vi=w_1, \ldots, w_D$ having a fixed number of D≤31 elements (as 31 metrics have been used, and while the user may decide to use less than 31 metrics). All the elements were generated from a standard normal distribution, with $\mu=0$ and $\sigma^2=1$, and normalized to sum up to 1. For this solution representation, a negative weight, if it occurs, can be considered as a "penalty" for the associated metric. During each successive generation, a proportion of the existing population was selected (see step 109 of FIG. 1) to breed a new generation. A truncation selection method was used to rate the fitness of each solution and to select the best fifth (100 out of 500) of the individual solutions, and to finally obtain the maximal Rouge score value (step 110). In such manner, "bad" solutions were discarded and prevented from being reproduced. During this experiment, an elitism method was also used to prevent loss of the best found solution in the population, simply by copying it to the next generation. Therefore, in step 112 new weighs vectors (genes/solutions) were introduced into the population (creating a new set u'). In such a manner, new points were added to the search space, and new points were explored. These new solutions were generated from those selected through the following genetic operators: mating, crossover, and mutation. In mating, a pair of "parent" solutions was randomly selected, and a new solution was created using crossover and mutuation (these are the most important operators of the genetic algorithm, and the GA performance is mainly influenced by these two operators). New parents were selected for each new child, and the process continued until a new population of solutions of appropriate size N was generated. Crossover was performed under the assumption that new solutions can be improved by re-using the good parts of older solutions. However, it was also assumed that it is better to keep some part of the population a from one generation to the next one. The crossover operator included a probability of 80% that a new and different offspring solution will be generated by calculating the weighted average of two "parent" vectors according to Vignaux et al., 1991, *A genetic algorithm for the linear transportation problem; IEEE Transactions on Systems, Man and Cybernetics*, 21:445-452. Formally, a new vector v was created from two vectors $v_1$ and $v_2$ according to the formula $v=\lambda*v_1+(1-\lambda)*v_2$ ($\lambda=0.5$ was selected). There was a probability of 20% for the offspring to be a duplicate of one of its parents. Mutation in GAs functions both to preserve the existing diversity and to introduce new variation. It is aimed at preventing GA from falling into a local extreme, but it was concluded that it should not be applied too often, as in that case the GA will could in fact change to random search. The mutation operator included a probability (3%) that an arbitrary weight in the weights vector will change by a uniformly randomized factor in the range of [−0.3, 0.3] from its original value.

The process was repeated during the experiment until reaching a termination condition. More specifically, the process was iterated until a plateau of solution/combination fitness was reached, i.e., a situation where successive iterations no longer produced better results. The minimal improvement in the experiments was set to $\epsilon=1.0E-21$.

The summarization experiment as described above was evaluated using a comparative experiment on two monolingual corpora of English and Hebrew texts and on a bilingual corpus of texts in both languages. The inventors were intentionally chose English and Hebrew, that belong to distinct language families (Indo-European and Semitic languages, respectfully), to ensure that for the evaluation results to be widely generalized. The specific goals of the experiment were to:

a. Evaluate the optimal sentence scoring models (i.e., the weights vector) induced from the corpora of summarized documents in two different languages;

b. Compare the performance of the GA-based multilingual summarization method to the most relevant prior art approaches;

c. Compare the performance of the method of the invention on both languages;

d. Determine whether the same sentence scoring model can be efficiently be used for extractive summarization; across two different languages It is expected that a proper sentence segmentation significantly contributes to the quality of summarization results. For English sentences, a sentence splitter which is provided within a MEAD summarizer (Radev et al., 2001, see "Background of the Invention") was used. A simple splitter that can split the text at periods, exclamation points, or question marks was used for the Hebrew text.

The English text material that was used during the experiments comprised the corpus of summarized documents available to the task of single document summarization at the Document Understanding Conference, 2002 (DUC, 2002). This benchmark dataset contains 533 news articles, each accompanied by two to three human-generated abstracts of approximately 100 words each. For the Hebrew language, however, to the best of the inventors' knowledge, no summarization benchmarks exist. Therefore, in order to generate a corpus of summarized Hebrew texts, the inventors set up an experiment where human assessors were given 50 news articles of 250 to 830 words each from the Website of the Ha'aretz newspaper. All assessors were provided with the "Tool Assisting Human Assessors (TAHA)" software tool that enables sentences to be easily selected and stored for later inclusion in a document extract. In total, 70 undergraduate students from the Department of Information Systems Engineering, Ben Gurion University of the Negev participated in the experiment. Each student participant was randomly assigned ten different documents and instructed to:

a. Spend at least five minutes on each document;

b. Ignore dialogs and quotations.

c. Read the whole document before beginning sentence extraction; ignore redundant, repetitive, and overly detailed information; and d. Remain within the minimal and maximal summary length constraints (95 and 100 words, respectively).

Summaries were assessed for quality by comparing each student's summary to those of all the other students using the Rouge evaluation toolkit adapted to Hebrew and the Rouge-1 metric (Lin et al., Rouge: *A package for automatic evaluation of summaries* In *Proceedings of the Workshop on Text Summarization Branches Out; WAS* 2004, pages 25-26). The inventors filtered all the summaries produced by assessors that received average Rouge score below 0.5, i.e. agreed with the rest of assessors in less than 50% of cases, Finally, the corpus of summarized Hebrew texts was compiled from the summaries of about 60% of the most consistent assessors, with an average of seven extracts per single document. The Rouge scores of the selected assessors have been found to distribute between 50 and 57 percents. The third, bilingual, experimental corpus was assembled from documents in both languages.

The inventors have evaluated English and Hebrew summaries using Rouge-1, 2, 3, 4, L, SU and W metrics, described in said article of Lin 2004). In agreement with Lin's conclusion, the results for the different metrics were not statistically distinguishable (according to Rouge, all metrics perform equally). However, Rouge-1 showed the largest variation across the metrics. In the following comparisons, all results are presented in terms of the Rouge-1 Recall metric. The inventors estimated the Rouge metric using 10-fold cross validation. The results of training and testing that comprise the average Rouge values obtained for English, Hebrew, and bilingual corpora are shown Table 3. It should be noted that the Rouge is only one example for obtaining the quality of the extracts. Similar tools for obtaining the desired quality exist in the art, and can be used in a similar manner.

TABLE 3

Results of 10-fold cross validation

|  | ENG | HEB | MULT |
|---|---|---|---|
| Train | 0.4483 | 0.5993 | 0.5205 |
| Test | 04461 | 0.5936 | 0.5027 |

Since the inventor experimented with a different number of English and Hebrew documents (533 and 50, respectively), they created 10 balanced bilingual corpora, each with the same number of English and Hebrew documents, by combining approximately 50 randomly selected English documents with all 50 Hebrew documents. Each corpus was then subjected to 10-fold cross validation, and the average results for training and testing were calculated. The results were compared with (1) a multilingual version of TextRank (ML_TR) (Mihaicea, 2005; *Language independent extractive summarization*. In *AAAI'05: Proceedings of the 20th national conference on Artificial intelligence*. pages 1688-1689.) as the best known multilingual summarizer; (2) with Microsoft Word's Autosummarize function (MS_SUM) as a widely used commercial summarizer; and (3) with the best single scoring method in each corpus. As a baseline, the inventors compiled summaries that have been created from the initial sentences (denoted by POS_F). Table 4 shows the comparative results (Rouge mean values) for English, Hebrew, and bilingual corpora, with the best summarizers on top.

TABLE 4

Summarization performance - Mean ROUGE-1

| Metric | ENG | HEB | MULT |
|---|---|---|---|
| MUSE | 0.4461 | 0.5921 | 0.4633 |
| COV_DEG | 0.4363 | 0.5679 | 0.4588 |
| D_COV_J | 0.4251 | 0.5748 | 0.4512 |
| POS_F | 0.4190 | 0.5678 | 0.4288 |
| ML_TR | 0.4138 | 0.5190 | 0.4288 |
| MS_SUM | 0.3097 | 0.4114 | 0.3184 |

The row MUSE in table 4 indicates the results of the present invention. Pairwise comparisons between summarizers indicate that all methods (except POS_F and ML_TR in the English and bilingual corpora and D_COV_J and POS_F in the Hebrew corpus) were significantly different at the 95% confidence level. The method of the present invention performed significantly better than TextRank in all three corpora and better than the best single methods COV_DEG in English and D_COV_J in Hebrew corpora respectively. The difference between the combination of all 31 metrics and COV_DEG is significant only with a one-tailed p-value of 0.0798 (considered not very significant). Both combinations significantly outperformed all the other summarizers that were compared. Table 5 above contains the results of weights for all the 31 metrics (i.e., the weights vector), as obtained in a training process according to the present invention.

TABLE 5

Induced weights for the best linear combination of scoring metrics

| Metric | ENG | HEB | MULT |
|---|---|---|---|
| COV_DEG | 8.490 | 0.171 | 0.697 |
| KEY_DEG | 15.774 | 0.218 | -2.108 |
| KEY | 4.734 | 0.471 | 0.346 |
| COV_PR | -4.349 | 0.241 | -0.462 |
| COV | 10.016 | -0.112 | 0.865 |
| D_COV_C | -9.499 | -0.163 | 1.112 |
| D_COV_J | 11.337 | 0.710 | 2.814 |
| KEY_PR | 0.757 | 0.029 | -0.326 |
| LUHN_DEG | 6.970 | 0.211 | 0.113 |
| POS_F | 6.875 | 0.490 | 0.255 |
| LEN_CH | 1.333 | -0.002 | 0.214 |
| LUHN | -2.253 | -0.060 | 0.411 |
| LUHN_PR | 1.878 | -0.273 | -2.335 |
| LEN_W | -13.204 | -0.006 | 1.596 |
| ML_TR | 8.493 | 0.340 | 1.549 |
| TITLE_E_J | -5.551 | -0.060 | -1.210 |
| TTTLE_E_O | -21.833 | 0.074 | -1.537 |
| D_COV_E_J | 1.629 | 0.302 | 0.196 |
| D_COV_O | 5.531 | -0.475 | 0.431 |
| TFISF | -0.333 | -0.503 | 0.232 |
| DEG | 3.584 | -0.218 | 0.059 |
| D_COV_E_O | 8.557 | -0.130 | -1.071 |
| PR | 5.891 | -0.639 | 1.793 |
| TITLE_J | -7.551 | 0.071 | 1.445 |
| TF | 0.810 | 0.202 | -0.650 |
| TITLE_O | -11.996 | 0.179 | -0.634 |
| SVD | -0.557 | 0.137 | 0.384 |
| TITLE_C | 5.536 | -0.029 | 0.933 |
| POS_B | -5.350 | 0.347 | 1.074 |
| GRASE | -2.197 | -0.116 | -1.655 |
| POS_L | -22.521 | -0.408 | -3.531 |
| Score | 0.4549 | 0.6019 | 0.526 |
| Iterations | 10 | 6 | 7 |

The experiments showed that the removal of highly-correlated metrics (the metric with the lower Rouge value out of each pair of highly correlated metrics) from the linear combination slightly improved the summarization quality, but the improvement was not statistically significant. Discarding bottom ranked features (up to 50%) also, did not affect the results significantly. Table 5 shows the best weights vectors generated from the training stage on all the documents in the English, Hebrew, and multilingual tone of 10 balanced) corpora and their Rouge training scores and number of GA iterations. While the optimal values of the weights are expected to be nonnegative, among the actual results are several negative values. Although there is no simple explanation for this outcome, it may be related to a well-known phenomenon from Numerical Analysis called over-relaxation (Friedman et al., 1994; *Fundamentals of Computer Numerical Analysis*, pages 347. CRC Press.). For example, Laplace equation $\phi_{XX}+\phi_{YY}=0$ is iteratively solved over a grid of points as follows: At each grid point let $\phi^{(n)}$, $\phi^{-(n)}$ denote the $n^{th}$ iteration as calculated from the differential equation and its modified final value, respectively. The final value is chosen as $\omega\phi^{(n)}+(1-\omega)\phi^{-(n-1)}$. While the sum of the two weights is obviously 1, the optimal value of $\omega$, which minimizes the number of iterations needed for convergence, usually satisfies $1<\omega<2$ (i.e., the second weight $1-\omega$ is negative) and approaches 2 the finer the grid gets. Though somewhat unexpected, this surprising result can be rigorously proved.

Assuming efficient implementation of the method of the invention, most metrics have a linear computational complexity relative to the total number of words in a document –O(n). As a result. The total computation time of the present method, given a trained model, is also linear (at factor of the number of metrics in a combination). The training time is proportional to the number of GA iterations multiplied by the number of individuals in a population, times the fitness evaluation (Rouge). On average, in the inventors experiments the GA performed 5-6 ions-selection-and reproduction, before reaching convergence score value.

The present invention therefore provides a new, GA based approach to multilingual extractive summarization. The method of the invention was evaluated on two languages from different language families, English and Hebrew. The experimental results showed that the summarization method of the present invention significantly outperformed TextRank, the best known language independent approach, in both Hebrew and English using either monolingual or bilingual corpora. Moreover, the experiments results suggest that the same weight vector, as obtained during the training phase is applicable across multiple languages.

As shown, the present invention provides a two-stage summarization method. During an off-line stage (which is performed only once), a weights vector is found. Then, the weights vector is used in an online stage, together with a set of metrics, to summarize an article. The method of the present invention provides significantly better results than comparable methods of the prior art. Moreover, once the weights vector is calculated, this weights vector is applicable to the summarization in any language, therefore making the method of the invention to be multi-lingual.

At this point it should be noted that multilingual sentence extraction in accordance with the present disclosure as described above typically involves the processing of input data and the generation of output data to some extent. This input data processing and output data generation may be implemented in hardware or software. For example, specific electronic components may be employed in a multilingual sentence extractor module or similar or related circuitry for implementing the functions associated with multilingual sentence extraction in accordance with the present disclosure as described above. Alternatively, one or more processors operating in accordance with instructions may implement the functions associated with multilingual sentence extraction in accordance with the present disclosure as described above. If such is the case, it is within the scope of the present disclosure that such instructions may be stored on one or more processor readable storage media (e.g., a magnetic disk or other storage medium).

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. A multilingual method for summarizing an article, which comprises:
    an offline stage which comprises:
    (a.) predefining a set of metrics;
    (b.) providing a collection of documents, and providing one or more of expert summaries for each article;
    (c.) indexing the sentences and words within each article;
    (d.) subjecting, using at least one computer processor, each sentence in said articles serially to the entire set of metrics, thereby obtaining for each sentence a plurality of sentence metrics values, each relating to one of said metrics respectively;
    (e.) guessing a population of u normalized weights vectors;
    (f.) for a selected weights vector $u_i$ in said population:
        (f.1.) for each sentence, calculating a sentence combined value, said combined value being a linear combination of the weights vector and said sentence metrics values;
        (f.2.) for each document ranking the sentences according to their combined values;
        (f.3.) for each document selecting a group of sentences having highest combined values;
        (f.4.) for each document, comparing said selected group with the one or more expert summaries, and obtaining a quality score for each article, selected group, and corresponding weights vector;
        (f.5.) repeating steps f1 to f4 for all the weights vectors in u;
    (g.) based on said quality scores, calculating a total score, and checking for convergence of a total of said quality scores in respect to previous iterations;
    (h.) upon convergence of said total quality scores, selecting a best weights vector which provides highest quality scores, and terminating the process;
    (i.) otherwise, if no convergence has yet obtained, selecting a group a of weights vectors out of population u that have provided highest quality scores, and by means of a genetic algorithm generating a new population u' of weights vectors, and repeating steps f to h with the population u' of weights vectors until convergence; and
    a real time stage which comprises:
    (j.) indexing sentences, and words within the document which needs summarization;
    (k.) calculating each of said predefined metrics of step a with respect to each of the sentences in the document to obtain sentence metric values;
    (l.) separately for each sentence, subjecting the sentence matrix values to the best weights vector as selected in step h of the offline stage, and summing up all weighted values to obtain a single combined value for each sentence;
    (m.) ranking the sentences according to their combined values to form a ranked list, and extracting a predetermined number of sentences from a top of the ranked list of sentences; and
    (n.) combining said extracted sentences thereby forming the document summary.

2. The method according to claim 1, wherein the offline stage is performed only once, while the best weights vector which is determined as a result of the offline stage is used thereafter in any performance of the real time stage.

3. The method according to claim 1, wherein even before convergence, one or more of the best determined weights vectors is transferred to the new population u' which is generated by the genetic algorithm.

4. The method according to claim 1, wherein said expert summaries comprise at east one of:
    abstracts and extracts.

5. The method according to claim 1, wherein the offline stage is performed on one language, and the resulting weights vector of the offline stage is used in real time to summarize articles in any other language.

* * * * *